(12) United States Patent
Qi et al.

(10) Patent No.: US 10,795,015 B2
(45) Date of Patent: Oct. 6, 2020

(54) SCANNING APPARATUS AND SECURITY-INSPECTION DEVICE WITH THE SAME

(71) Applicants: SHENZHEN CCT THZ TECHNOLOGY CO., LTD., Shenzhen (CN); CHINA COMMUNICATION TECHNOLOGY CO., LTD., Shenzhen (CN)

(72) Inventors: Chunchao Qi, Shenzhen (CN); Rong Wang, Shenzhen (CN); Guangsheng Wu, Shenzhen (CN); Shukai Zhao, Shenzhen (CN); Qing Ding, Shenzhen (CN)

(73) Assignees: SHENZHEN CCT THZ TECHNOLOGY CO., LTD., Shenzhen (CN); CHINA COMMUNICATION TECHNOLOGY CO., LTD., Shenzhen (CN)

( * ) Notice: Subject to any disclaimer, the term of this patent is extended or adjusted under 35 U.S.C. 154(b) by 146 days.

(21) Appl. No.: 16/034,380

(22) Filed: Jul. 13, 2018

(65) Prior Publication Data

US 2018/0321374 A1 Nov. 8, 2018

Related U.S. Application Data

(63) Continuation of application No. PCT/CN2017/080997, filed on Apr. 19, 2017.

(30) Foreign Application Priority Data

Apr. 26, 2016 (CN) .......................... 2016 1 0263894

(51) Int. Cl.
*G01S 13/88* (2006.01)
*G01S 13/89* (2006.01)
*G01S 7/02* (2006.01)

(52) U.S. Cl.
CPC ............ *G01S 13/887* (2013.01); *G01S 13/89* (2013.01); *G01S 2007/027* (2013.01)

(58) Field of Classification Search
CPC ... G01S 13/887; G01S 13/89; G01S 2007/027
See application file for complete search history.

(56) References Cited

U.S. PATENT DOCUMENTS

| 2009/0109330 A1 | 4/2009 | Nakano |
| 2013/0141271 A1* | 6/2013 | Mobius .................. H01Q 13/00 342/175 |

(Continued)

FOREIGN PATENT DOCUMENTS

| CN | 201562756 U | 8/2010 |
| CN | 102063012 A | 5/2011 |

(Continued)

*Primary Examiner* — Erin F Heard
*Assistant Examiner* — Donald H B Braswell

(57) ABSTRACT

The present disclosure relates to a scanning apparatus and a security-inspection device with the same. The scanning apparatus include: at least one millimeter-wave transreceiving antenna module, wherein the millimeter-wave transreceiving antenna module include a plurality of millimeter-wave transreceiving antenna units each having a signal terminal facing the predetermined scanning area, and a dustproof film covering the signal terminal of each of the millimeter-wave transreceiving antenna units. The scanning mechanism is simple in structure, more convenient for maintenance, and has a lower cost. When each millimeter-wave transceiving antenna unit emits and receives millimeter waves, the millimeter waves pass through the dustproof film without passing through the organic glass, and the attenuation of the millimeter wave signal is small, thereby improving the 3D imaging effect of the security-inspection device.

19 Claims, 3 Drawing Sheets

(56) References Cited

U.S. PATENT DOCUMENTS

| | | | | |
|---|---|---|---|---|
| 2014/0340851 A1* | 11/2014 | Yomogita | ............ | H05K 5/0017 |
| | | | | 361/725 |
| 2015/0048964 A1 | 2/2015 | Chen | | |
| 2015/0177165 A1* | 6/2015 | Ying | ...................... | A61B 6/032 |
| | | | | 378/9 |
| 2015/0323664 A1* | 11/2015 | Wu | ......................... | G01S 13/02 |
| | | | | 342/22 |
| 2016/0143601 A1* | 5/2016 | Linev | ................... | G01V 5/0058 |
| | | | | 378/62 |
| 2016/0223664 A1* | 8/2016 | Colantonio | ............ | B64D 47/08 |

FOREIGN PATENT DOCUMENTS

| | | |
|---|---|---|
| CN | 102393537 A | 3/2012 |
| CN | 102426361 A | 4/2012 |
| CN | 102540186 A | 7/2012 |
| CN | 202562506 U | 11/2012 |
| CN | 203180908 U | 9/2013 |
| CN | 104375145 A | 2/2015 |
| CN | 205139395 U | 4/2016 |
| CN | 105759315 A | 7/2016 |
| CN | 205720716 U | 11/2016 |

\* cited by examiner

SCANNING APPARATUS AND SECURITY-INSPECTION DEVICE WITH THE SAME

CROSS-REFERENCE TO RELATED APPLICATIONS

The present application is a continuation-application of International (PCT) Patent Application No. PCT/CN2017/080997 filed on Apr. 19, 2017, which claims foreign priority of Chinese Patent Application No. 201610263894.2, filed on Apr. 26, 2016 in the State Intellectual Property Office of China, the entire contents of which are hereby incorporated by reference.

TECHNICAL FIELD

The present disclosure relates to the field of security-inspection device, in particular to a scanning apparatus and a security-inspection device with the same.

BACKGROUND

The frequency of millimeter waves is from 30 GHz to 300 GHz (which have the wavelength ranging from 1 mm to 10 mm). In practical engineering applications, the low end frequency of millimeter waves is often reduced to 26 GHz. The position of the frequency of millimeter waves in the electromagnetic spectrum is between that of infrareds and microwaves. In comparison with infrareds, millimeter waves have the capability of working around the clock and can be used in the harsh environment such as smoke, cloud, and fog. In comparison with microwaves, millimeter waves have the typical characteristics of shorter wavelength, wider bandwidth, very wide usage, and the propagation characteristics in the atmosphere.

Specifically, millimeter waves mainly have the following characteristics.

With high precision, since a millimeter wave radar is easier to obtain a narrow wave beam and a wide absolute bandwidth, and the millimeter wave radar system is more resistant to electronic interference.

In a Doppler radar, the resolution of the millimeter wave with Doppler frequency is high.

In a millimeter wave imaging system, the millimeter wave is sensitive to the shape and structure of the object and has a good capability to distinguish metal objects from the background. The capability of recognizing and detecting the object can be improved since the obtained image has a high resolution.

The millimeter wave can penetrate the plasma.

In comparison with infrared laser, the millimeter wave is less affected by harsh natural environments.

The millimeter wave system is small in size and light in weight, and the millimeter wave circuit is much smaller in size in comparison with the microwave circuit, hence the millimeter wave system is easier to integrate.

These unique properties give an extensive application prospect to millimeter wave technology. Especially in the field of non-destructive testing and security inspection.

In the early development of millimeter wave imaging, millimeter wave imaging systems use a single-channel mechanical scanning mechanism. The imaging system has a simple structure but requires a long scanning time. In order to shorten the scanning time, Millivision has developed a Veta125 imager. In addition to an emission scanning system, the imager has an 8×8 array receiving mechanism. Trex also developed a PMC-2 imaging system. The antenna unit in the imaging system uses a 3 mm phased array antenna technology. The PMC-2 imaging system uses the millimeter wave with the center frequency of 84 GHz. Lockheed Martin also developed a focal plane imaging array imaging system, which uses the millimeter wave with the center frequency of 94 GHz. TRW has developed a passive millimeter wave imaging system, which uses the millimeter wave with the center frequency of 89 GHz. At present, in the field of millimeter wave imaging, the research achievements of millimeter wave imaging are mainly contributed by the Pacific Northwest National Laboratory. Mc Makin et al. in the laboratory has developed a 3D holographic imaging scanning system. The scanning mechanism of the imaging system is based on cylindrical scanning, and the system has already achieved the commercialization of millimeter wave imaging systems. The imaging system uses an active imaging mechanism to invert and obtain a 3D millimeter wave image of a target through a holographic algorithm. The technology has been authorized to L-3 Communications and Save View Ltd. The Pacific Northwest National Laboratory is currently working on the development of the millimeter wave imaging system with a higher frequency. In addition to the above-mentioned laboratories and companies, in the United Kingdom, the United States and other countries, there are many research institutes and companies involved in the study of millimeter wave imaging technology. For example, the Army Navy Air Force Research Laboratory, the Navy Coastal Base and other companies as well as Delaware, Arizona and other universities of the United States, and the Reading University, the Durham University and Farran company of the United Kingdom. In addition to the United Kingdom and the United States, the Microwave and Radar Institute and the German Aerospace Center in Germany have also participated in the research of millimeter wave imaging technology. Australia's ICT Center, Japan's NEC Corporation and others have reported the relevant results of millimeter wave imaging research.

The millimeter wave imaging methods are mainly divided into active millimeter wave imaging and passive millimeter wave imaging. Passive millimeter wave imaging systems have the advantage that the structure is relatively simple and the implementation cost is lower, and have the disadvantage that the imaging time is too long and the imaging resolution is poor. With the improvement of the millimeter wave device and the development of millimeter wave device technology, the active millimeter wave imaging has begun to attract more and more attentions. In the active millimeter wave imaging, active synthetic aperture imaging and active holographic imaging are the main imaging methods. The method of millimeter wave holographic imaging is a method based on optical holography, which uses the electromagnetic wave coherence principle. The transmission antenna emits a highly stable millimeter wave signal first, the reception antenna receives the transmitted signal at each point on the target and perform a coherent processing on the echo signal and the highly coherent reference signal. The amplitude and phase information of the echo signal is extracted to obtain the emission characteristics at the points on the target, and eventually a target millimeter wave image in the scene can be obtained through the data and image processing method. The millimeter wave image obtained by active millimeter wave holographic imaging has high resolution, which can greatly shorten the imaging time when cooperate with mechanical scanning, and can realize engineering, hence the millimeter wave holographic imaging is particularly suitable for active millimeter wave short-range imaging.

In the severe international anti-terrorism situation, millimeter wave active circular scanning 3D holographic imaging body security-inspection devices have been used in airports, train stations, and other people-intensive areas in foreign countries because of their features such as strong penetration, non-contact, non-injury, and fast detection speed, which realize non-strip and non-contact 3D holographic imaging detection of the objects under the cover of the clothing of a (human) body, and can detect metal and non-metallic items such as guns, knives, drugs, liquids, and chips.

The 3D holographic imaging technology in the world are currently mostly adopt active millimeter wave cylindrical array rotary scanning, that is, the array-type millimeter-wave transceiving antenna modules are used to obtain body scanning information, which have numerous millimeter wave receive/transmit antenna modules, and the manufacturing cost is expensive. It is necessary to perform dust protection to avoid the precision components damage caused by dust accumulations. Referring to FIG. 1, a schematic diagram of the operation of a security-inspection device according to the prior art is depicted. In the security-inspection device of the prior art, a millimeter-wave transceiving antenna module 300 is integrally placed in a sealed space enclosed by an organic glass 303 of 3 mm in thickness and other mechanical structures, thereby sealing and isolating the transmitting/receiving antenna module 300 to realize dust-proof. When a transmitting antenna 301 emits millimeter waves and a receiving antenna 302 receives millimeter waves, the millimeter waves need to pass through the organic glass 303 of 3 mm in thickness. Since the organic glass is too thick and has strong attenuation to the millimeter-wave transceiving signals. The organic glass is special in material, which is difficult in processing and the price of which is expensive, so that the time and cost of the R&D and production of the instrument is increased. In addition, the area of organic glass is large (210 mm in height and 130 mm in width), and the installation structure is complicated. When the human body security instrument is maintained, the organic glass needs to be disassembled and the process is cumbersome and inconvenient.

SUMMARY

To address the problems of the millimeter-wave transceiving antenna module in the current security-inspection device that the millimeter wave signals are attenuated when passing through the organic glass, the arc-shaped organic glass is difficult to process, and not easy to maintain which caused by sealing with the organic glass and other mechanical structures, a scanning apparatus is provided in the present disclosure.

The present disclosure may be implemented in such a manner that a scanning apparatus may include: at least one millimeter-wave transceiving antenna module configured to scan a to-be-imaged object in a predetermined scanning area, wherein the millimeter-wave transceiving antenna module may include a plurality of millimeter-wave transceiving antenna units each having a signal terminal facing the predetermined scanning area, and the scanning apparatus may further include a dustproof film covering the signal terminal of each of the millimeter-wave transceiving antenna units.

Furthermore, the scanning apparatus may further include a driving member for driving the millimeter-wave transceiving antenna module to move along a predetermined trajectory, so as to scan the predetermined scanning area.

Furthermore, where the scanning apparatus may include two millimeter-wave transceiving antenna modules; the two millimeter-wave transceiving antenna modules may be opposite to each other; the predetermined scanning area may be located between the two millimeter-wave transceiving antenna modules, which may be connected via a connecting member, and the connecting member may be driven to move by the driving member.

Furthermore, where each millimeter-wave transceiving antenna module may include at least two millimeter-wave transceiving antenna units, millimeter waves transmitted from the millimeter-wave transceiving antenna units in sequence may pass through the dustproof film and irradiate to the to-be-imaged object, and the millimeter waves may be reflected by the to-be-imaged object to pass through the dustproof film and be sequentially received by the millimeter-wave transceiving antenna units.

Furthermore, where the millimeter-wave transceiving antenna units in each of the millimeter-wave transceiving antenna modules may be arranged in at least one column.

Furthermore, where each of the millimeter-wave transceiving antenna units may include a transmitting antenna and a receiving antenna disposed adjacent to the transmitting antenna, or each of the millimeter-wave transceiving antenna units may be an integrated transceiver antenna.

Furthermore, the scanning apparatus may further include at least one protection device connected to the at least one millimeter-wave transceiving antenna module and configured to be stretched out and drawn back along a predetermined trajectory of the at least one millimeter-wave transceiving antenna module respectively.

Furthermore, where in a direction of the predetermined trajectory, the millimeter-wave transceiving antenna module may have a first side portion and a second side portion distributed back-to-back. The predetermined trajectory may have a first end near to the first side portion and a second end near to the second side portion, and the amount of the predetermined trajectory may be at least one. The two protection devices may be arranged on each predetermined trajectory, one of which may be disposed between the first end of each predetermined trajectory and the corresponding first side portion, and the other may be disposed between the second end of each predetermined trajectory and the second side portion.

Furthermore, the scanning apparatus may include two millimeter-wave transceiving antenna modules distributed oppositely, the predetermined scanning area may be located between the two millimeter-wave transceiving antenna modules, and the two millimeter-wave transceiving antenna modules may rotate around a same plumb line to scan the predetermined scanning area; or the scanning apparatus may include two millimeter-wave transceiving antenna modules distributed oppositely the predetermined scanning area may be located between the two millimeter-wave transceiving antenna modules, and the two millimeter-wave transceiving antenna modules may move along a same horizontal direction to scan the predetermined scanning area; or the scanning apparatus may include two millimeter-wave transceiving antenna modules distributed oppositely, the predetermined scanning area may be located between the two millimeter-wave transceiving antenna modules, and the two millimeter-wave transceiving antenna modules may move along a vertical direction to scan the predetermined scanning area; or the scanning apparatus may include a millimeter-wave transceiving antenna module, the predetermined scanning area may be located at a front side of the signal terminal, and the millimeter-wave transceiving antenna module may rotate around a plumb line to scan the predetermined scanning area; or the scanning apparatus may include a millimeter-wave transceiving antenna module, the predetermined scanning area may be located at a front side of the signal terminal, and the millimeter-wave transceiving antenna module may move along a horizontal direction to scan the predetermined scanning area; or the scanning apparatus may include a millimeter-wave transceiving antenna module, the predetermined scanning area may be located at a front side of the signal terminal, and the millimeter-wave transceiving antenna module may move along a vertical direction to scan the predetermined scanning area.

Furthermore, where the dustproof film may be a polytetrafluoroethylene film, a polystyrene film, a polyvinyl acetate film, a polyimide film, or a polyethylene film.

To address the technical problems above, a security-inspection device is provided in the present disclosure. The security-inspection device may include the scanning apparatus above-mentioned, and an image processing device electrically connected with the scanning apparatus and configured to form a 3D image of a to-be-imaged object according to a detection signal of the millimeter-wave transceiving antenna module.

Furthermore, the security-inspection device may further include a main body having an inner cavity, where the main body having an entrance and an exit both communicating with the inner cavity respectively. The predetermined scanning area may be formed in the main body, and the scanning apparatus may be mounted on the main body.

As compared to the prior art, the technical solutions provided in the present disclosure may have the following benefits: the scanning apparatus may include: at least one millimeter-wave transreceiving antenna module, wherein the millimeter-wave transreceiving antenna module include a plurality of millimeter-wave transreceiving antenna units each having a signal terminal facing the predetermined scanning area, and a dustproof film covering the signal terminal of each of the millimeter-wave transreceiving antenna units. The dustproof film in the present disclosure may be disposed on the millimeter-wave transceiving antenna module to seal the signal terminal of the millimeter-wave transceiving antenna unit so as to realize dust-proof. Compared with the existing security-inspection device which is disposed with the arc-shaped organic glass to seal the entire millimeter-wave transceiving antenna module, the scanning mechanism may be simple in structure, more convenient for maintenance, and may have a lower cost. When the millimeter-wave transceiving antenna unit emits and receives millimeter waves, the millimeter waves may pass through the dustproof film without passing through the organic glass, and the attenuation of the millimeter wave signal may be small, thereby improving the 3D imaging effect of the security-inspection device.

BRIEF DESCRIPTION OF THE DRAWINGS

In order to more clearly illustrate the technical solution in the embodiments of the present disclosure, the accompanying drawings to be used in the description of the embodiments are briefly described below. It will be apparent that the accompanying drawings in the following description are merely embodiments of the present disclosure, other accompanying drawings may be obtained without creative work for those skilled in the art.

DETAILED DESCRIPTION

Figure 1:
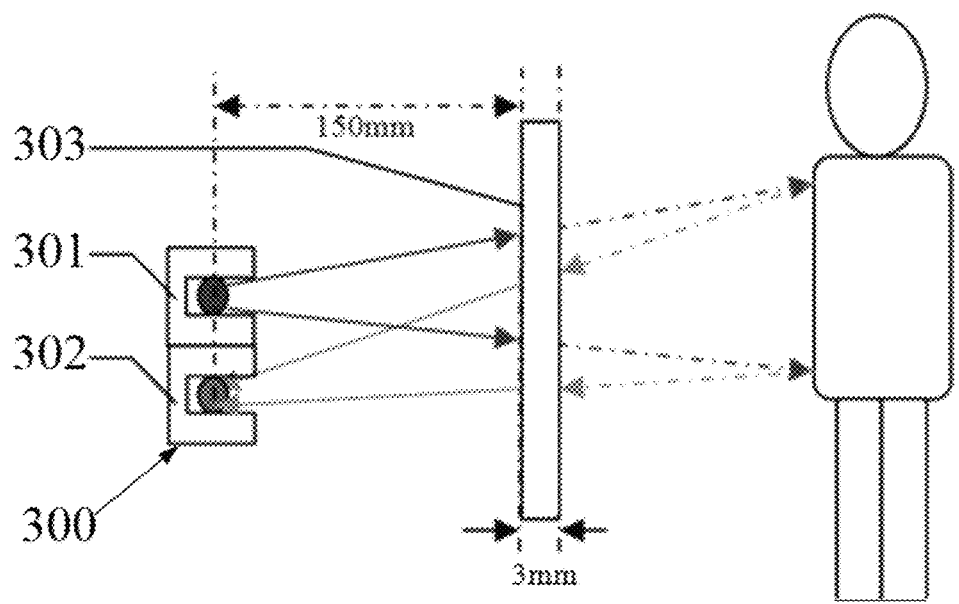
FIG. 1 is a schematic diagram of the operation of a security-inspection device according to the prior art.
Figure 2:
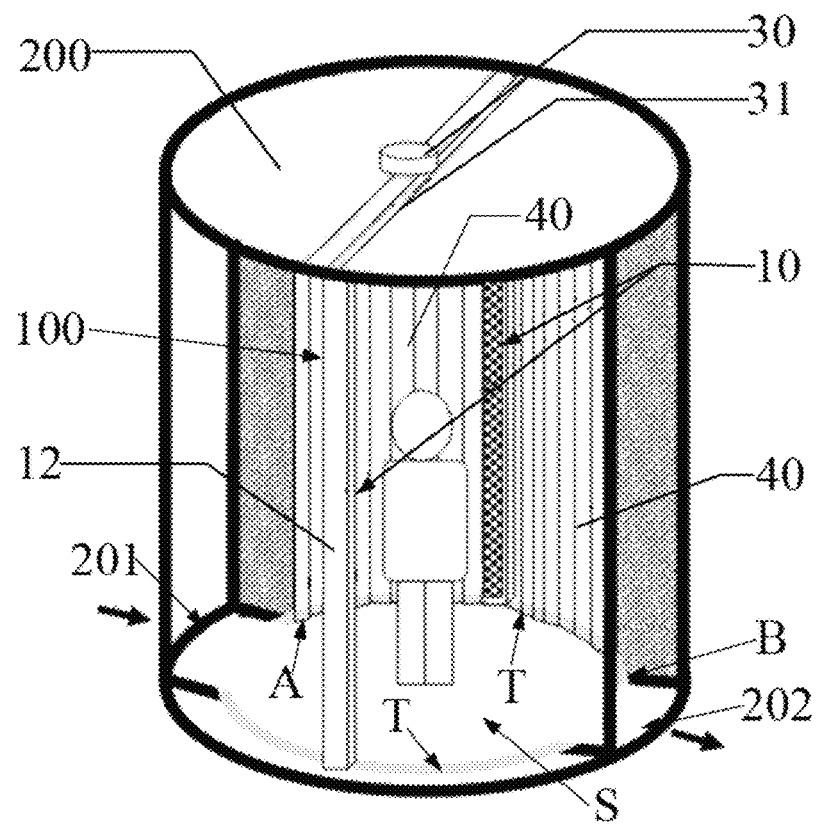
FIG. 2 is a schematic diagram of the structure of a security-inspection device according to one embodiment of the present disclosure.
Figure 3:
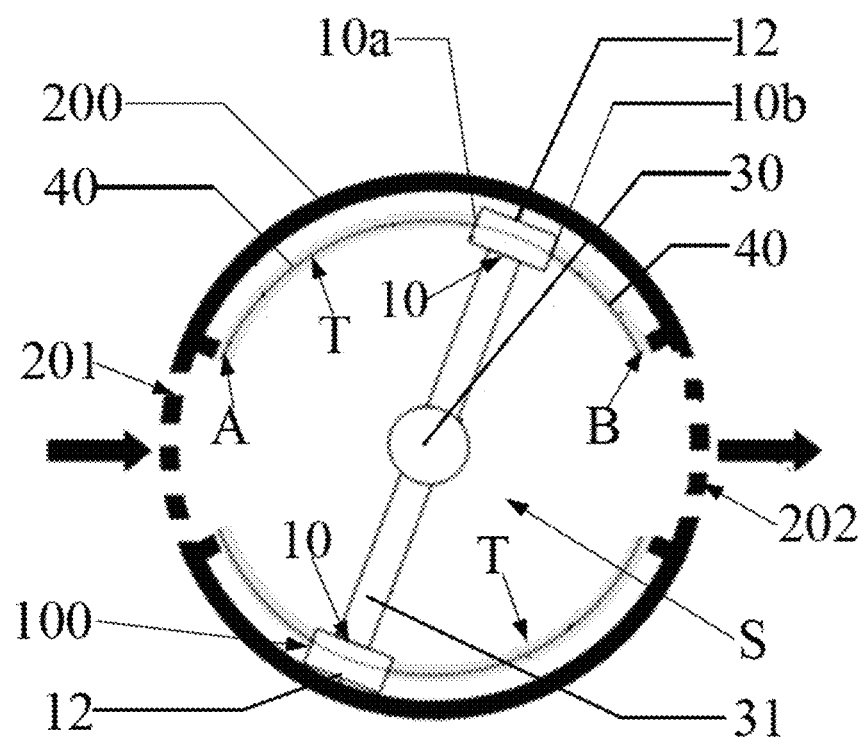
FIG. 3 is a top view of the security-inspection device of FIG. 2.

The technical schemes in the embodiments of the present disclosure will now be described in conjunction with the accompanying drawings in the embodiments of the present disclosure, and it will be apparent that the described embodiments are merely part of the embodiments of the disclosure, and are not all embodiments. All other embodiments obtained based on the embodiments in the present disclosure by those of ordinary skill in the art without making creative work are within the scope of the present disclosure.

Referring to FIG. 2 to FIG. 5, a schematic diagram of the structure of a security-inspection device according to one embodiment of the present disclosure is depicted. A scanning apparatus 100 provided in this embodiment may include at least one millimeter-wave transceiving antenna module 10 and a dustproof film 20. The millimeter-wave transceiving antenna module 10 may be configured to scan a to-be-imaged object in a predetermined scanning area S. The millimeter-wave transceiving antenna module 10 may include a plurality of millimeter-wave transceiving antenna units 11 each having a signal terminal facing the predetermined scanning area S, and a dustproof film 20 covering the signal terminal of each of the millimeter-wave transceiving antenna units 11.

The dustproof film 20 may be disposed on the millimeter-wave transceiving antenna module 10, so as to seal and isolate the signal terminal of each of the millimeter-wave transceiving antenna units 11 to realize dust-proof. Compared with the existing security-inspection device which is disposed with the arc-shaped organic glass to seal the entire millimeter-wave transceiving antenna module, the scanning apparatus 100 may be simple in structure, more convenient for maintenance, and may have a lower cost. When each millimeter-wave transceiving antenna unit 11 emits and receives millimeter waves, the millimeter waves may pass through the dustproof film 20 without passing through the organic glass, and the attenuation of the millimeter wave signal may be small, thereby improving the 3D imaging effect of the security-inspection device.

Specifically, the scanning apparatus 100 may be applied to an active millimeter wave 3D imaging security-inspection device. The scanning apparatus 100 can also be applied to other applications which need to realize 3D imaging of the to-be-imaged object.

Furthermore, in one embodiment, the millimeter-wave transceiving antenna module 10 may further include at least one mount seat 12 for mounting each millimeter-wave transceiving antenna unit 11. Each of the millimeter-wave transceiving antenna units 11 may be mounted on the mount seat 12 by adhesion or other mechanical connection manners. The shape of the mount 12 may be determined in accordance with the arrangement manner of the millimeter-wave transceiving antenna units 11. Specifically, the millimeter-wave transceiving antenna units 11 may be distributed in column, and accordingly, the mounting seat 12 may extend in a strip shape. It can be understood that the mount seat 12 may not be installed, and the millimeter-wave transceiving antenna units 11 in each millimeter-wave transceiving antenna module 10 may be connected by adhesion or other mechanical connection manners.

Furthermore, the scanning apparatus 100 may further include a driving member 30 configured for driving the millimeter-wave transceiving antenna module 10 to move along a predetermined trajectory so as to scan the predetermined scanning area S. The driving member 30 may be applied to drive the millimeter-wave transceiving antenna model 10 to move. The predetermined trajectory T may be a vertical line, a horizontal line, an arc, or the like. When different predetermined trajectories T are used, there may be corresponding algorithms for processing detection signals of the millimeter-wave transceiving antenna module 10 to realize 3D imaging. The driving member 30 may be a rotation driving member, a linear driving member, a combination of a rotation driving member, a transmission mechanism, and a combination of a linear driving member and a transmission mechanism, which may be specifically arranged according to the predetermined trajectory T. The rotation driving member may be a motor, a hydraulic motor, or the like. The linear driving member may be an electric cylinder, a hydraulic cylinder, or the like. In this embodiment, the driving member 30 may be a servo motor, where the servo motor can accurately control the speed and position of the millimeter-wave transceiving antenna module 10. It can be understood that the millimeter-wave transceiving antenna module 10 may also not be configured with the driving member 30 and to move manually.

Furthermore, in one embodiment, the scanning apparatus 100 may include two millimeter-wave transceiving antenna modules 10. The two millimeter-wave transceiving antenna modules 10 may be oppositely to each other (e.g., distributed to face with each other), and the predetermined scanning area S may be located between the two millimeter-wave transceiving antenna modules 10. The two millimeter-wave transceiving antenna modules 10 may be connected via a connecting member 31, and the connecting member 31 may be driven to move by the driving member 30. When the driving member 30 drives the connecting member 31 to move, the two millimeter-wave transceiving antenna modules 10 may be simultaneously driven by the driving member 30, and two sides of the to-be-imaged object may be simultaneously scanned, so that the scanning time may be shortened. Specifically, the connecting member 31 may be a cantilever arm disposed above the predetermined scanning region S. The two millimeter-wave transceiving antenna modules 10 may be respectively connected to two ends of the cantilever arm. The driving member 30 may be a rotary driving member, and the driving member 30 may drive the cantilever arm to rotate. The cantilever may drive the two millimeter-wave transceiving antenna modules 10 to rotate at a predetermined angle (for example, 120°), so that both sides of the object to-be-imaged object can be simultaneously scanned. In addition, the amount and movement range of the millimeter-wave transceiving antenna modules 10 may be not limited, and may be configured as needed.

Furthermore, in one embodiment, each millimeter-wave transceiving antenna modules 10 may include two millimeter-wave transceiving antenna units 11. The millimeter waves transmitted from the millimeter-wave transceiving antenna units 11 in sequence may pass through the dustproof film 20 and irradiate to the to-be-imaged object. The millimeter waves may be reflected by the to-be-imaged object to pass through the dustproof film 20 and be sequentially received by the millimeter-wave transceiving antenna unit 11. The configuration may be compact in structure, which may be capable of scanning the predetermined scanning area S by using fewer millimeter-wave transceiving antenna modules 10 to move along the predetermined trajectory T. Specifically, the one millimeter-wave transceiving antenna module 10 may have 192 millimeter-wave transceiving antenna units 11, so that the predetermined scanning area S may be maintained within a predetermined height range. The amount of millimeter-wave transceiving antenna units 11 may be configured as needed.

Furthermore, in one embodiment, the millimeter-wave transceiving antenna units 11 (in each of the millimeter-wave transceiving antenna modules 10) may be arranged in at least one column. The configuration may be compact in structure, the millimeter-wave transceiving antenna modules 10 may move along the predetermined trajectory T and may scan the predetermined scanning area S. In one embodiment, the millimeter-wave transceiving antenna units 11 may be arranged in column. The arrangement direction may be perpendicular to the tangential direction of the predetermined trajectory T of the millimeter-wave transceiving antenna module 10. The predetermined scanning area S may be scanned by using the minimum amount of the millimeter-wave transceiving antenna units 11. It can be understood that the plurality of millimeter-wave transceiving antenna units 11 can also be arranged on an entire surface in two dimensions and directly scan the predetermined scanning area S, which requires more millimeter-wave transceiving antenna units 11. In one embodiment, the millimeter-wave transceiving antenna units 11 may also be distributed along a predetermined curve to move along the predetermined trajectory T, and may scan the predetermined scanning area S.

Figure 4:
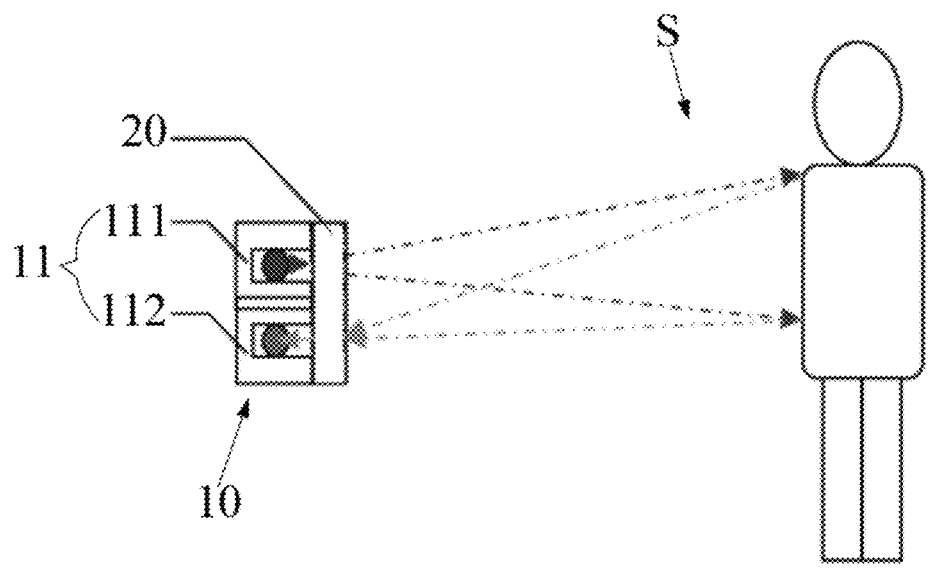
FIG. 4 is a schematic diagram of the using of the security-inspection device of FIG. 2.

Furthermore, in one embodiment, as shown in FIG. 4, each of the millimeter-wave transceiving antenna units 11 may include transmission antenna(s) 111 and reception antenna(s) 112 disposed adjacent to the transmission antenna(s) 111. The transmission antenna(s) 111 and the reception antenna(s) 112 may be an electromagnetic transmitting antenna and an electromagnetic receiving antenna respectively, which may have the frequency ranging from 26 GHz to 300 GHz. The signal terminal of the transmitting antenna(s) 111 and the receiving antenna(s) 112 may both face the predetermined scanning area S. The millimeter waves sequentially emitted by the transmission antenna(s) 111 in all the millimeter-wave transceiving antenna units 11 may pass through the dustproof film 20 and irradiate the to-be-imaged object. The millimeter waves reflected by the to-be-imaged object may pass through the dustproof film 20 and may be sequentially received by the reception antenna(s) 112 corresponding to the transmission antenna(s) 111. In one embodiment, in each millimeter-wave transceiving antenna module 10, the transmission antenna(s) 111 and the reception antenna(s) 112 in each millimeter-wave transceiving antenna unit 11 may be sequentially disposed in column, which may be compact in structure and facilitate the scanning of the predetermined scanning area S. It can be understood that, in each millimeter-wave transceiving antenna module 10, the transmission antenna(s) 111 and the reception antenna(s) 112 in each millimeter-wave transceiving antenna unit 11 can also be staggered, and the arrangement may also scan the predetermined scanning area S. In one embodiment, each of the millimeter-wave transceiving antenna unit 11 may be an integrated transceiver antenna, which may be compact in structure and easy to assemble. The integrated transceiver antenna may be an electromagnetic wave integrated transceiver antenna with the frequency ranging from 26 GHz to 300 GHz. The dustproof film 20 may be adhered to the signal terminals of all the millimeter-wave transceiving antenna units 11 on the same millimeter-wave transceiving antenna module 10, which may have the structure capable of being assembled and disassembled easily, and realizing the sealing and dustproof of the signal end.

Figure 5:
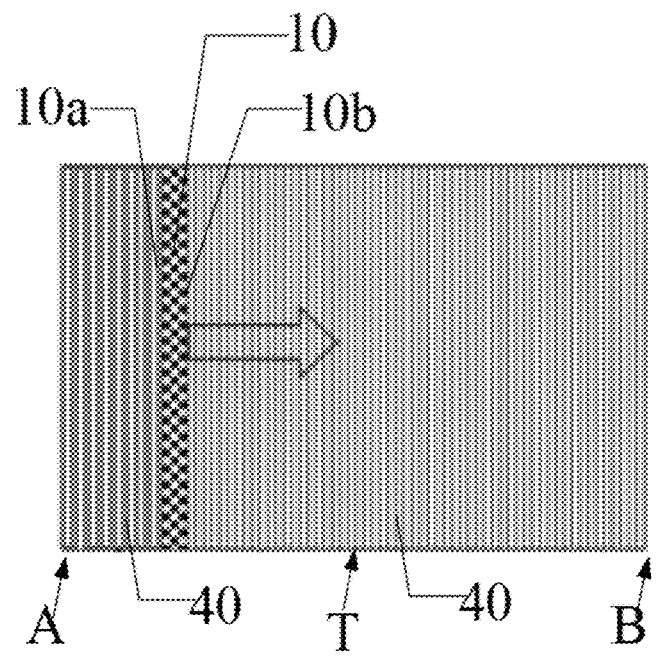
FIG. 5 is an assembly diagram of a millimeter-wave transceiving antenna module and a protection device applied in the security-inspection device of FIG. 2.

Furthermore, in one embodiment, as shown in FIG. 5, the millimeter-wave transceiving antenna module 10 may further include protection device(s) 40 connected to the millimeter-wave transceiving antenna module 10 and configured to be stretched out and drawn back along the predetermined trajectory T of the millimeter-wave transceiving antenna module 10. When the millimeter-wave transceiving antenna module 10 moves along the predetermined trajectory T, the protection device(s) 40 may be stretched out and drawn back with the millimeter-wave transceiving antenna module 10, and the protection device(s) 40 may function as a barrier to prevent foreign object from falling into or prevent human body from entering the movement trajectory of the millimeter-wave transceiving antenna module 10. Specifically, the protection device(s) 40 may be sliding doors, folding screens or other foldable structures, retractable structures. In addition, the main body 200 may be configured with a rail for mounting the protection device(s) 40 so that the protection device(s) 40 can be stretched out and drawn back on the predetermined trajectory T.

Furthermore, referring to FIG. 0.3 and FIG. 5, in a direction of the predetermined trajectory T, the millimeter-wave transceiving antenna module 10 may have a first side portion 10*a* and a second side portion 10*b* distributed back-to-back. The predetermined trajectory T may have a first end A near to the first side portion 10*a* and a second end B near to the second side portion 10*b*. The amount of the predetermined trajectory T may be at least one, and two protection devices 40 may be arranged on each predetermined trajectory T. One of the two protection devices 40 may be disposed between the first end A of the corresponding predetermined trajectory T and the first side portion 10*a*. The other of the two protection devices 40 may be disposed between the second end B of each predetermined trajectory T and the second side portion 10*b*. Two protection devices 40 may be respectively disposed on the two side portions of the bar-shaped millimeter-wave transceiving antenna module 10. One side of the protection device 40 may be fixed to the first end A or the second end B of the predetermined track T, and the other side of the protection device 40 may be fixed to one of the side portions of the millimeter wave transceiver antenna module 10. When the millimeter wave transceiver antenna module 10 moves on the predetermined trajectory T, the two protection devices 40 may be stretched out and drawn back with the millimeter wave transceiver antenna module 10.

Furthermore, in one embodiment, the scanning apparatus 100 may include two millimeter-wave transceiving antenna modules 10 opposite to each other. The predetermined scanning area S may be located between the two millimeter-wave transceiving antenna modules 10, and the two millimeter-wave transceiving antenna modules 10 may rotate around a same plumb line to scan the predetermined scanning area S. This scheme can realize cylindrical rotation scanning, and can complete the 3D scanning of a human body by scanning once when a man stands in the predetermined scanning area S.

In one embodiment, the scanning apparatus 100 may include two millimeter-wave transceiving antenna modules 10 opposite to each other. The predetermined scanning area S may be located between the two millimeter-wave transceiving antenna modules 10. The two millimeter-wave transceiving antenna modules 10 may move along a same horizontal direction to scan the predetermined scanning area S. This scheme can realize bilateral horizontal scanning, and can complete the 3D scanning of a human body by scanning once when a man stands in the predetermined scanning area S.

In one embodiment, the scanning apparatus 100 may include two millimeter-wave transceiving antenna modules 10 opposite to each other. The predetermined scanning area S may be located between the two millimeter-wave transceiving antenna modules 10. The two millimeter-wave transceiving antenna modules 10 may move along a vertical direction to scan the predetermined scanning area S. This scheme can realize the bilateral vertical scanning, and can complete the 3D scanning of a human body by scanning once when a man stands in the predetermined scanning area S.

In one embodiment, the scanning apparatus 100 may include a millimeter-wave transceiving antenna module 10. The predetermined scanning area S may be located at a front side of the signal terminal. The millimeter-wave transceiving antenna module 10 may rotate around a plumb line to scan the predetermined scanning area S. This scheme can realize partial rotation scanning or cylindrical rotation scanning. For example, the millimeter-wave transceiving antenna module 10 may have a rotation angle range of 120°, and can complete the 3D scanning of a human body by scanning twice when a man stands in the predetermined scanning area S. The front and rear sides of the human body may be respectively facing the millimeter-wave transceiving antenna module 10. In one embodiment, the millimeter-wave transceiving antenna module 10 may have a rotation angle range of 300°, and can complete the 3D scanning of a human body by scanning once when a man stands in the predetermined scanning area S.

In one embodiment, the scanning apparatus 100 may include a millimeter-wave transceiving antenna module 10. The predetermined scanning area S may be located at a front side of the signal terminal. The millimeter-wave transceiving antenna module 10 may move along a horizontal direction to scan the predetermined scanning area S. This scheme can realize single-side horizontal scanning, and can complete the 3D scanning of a human body by scanning twice when a man stands in the predetermined scanning area S. The front and rear sides of the human body may be respectively facing the millimeter-wave transceiving antenna module 10.

In one embodiment, the scanning apparatus 100 may include a millimeter-wave transceiving antenna module 10. The predetermined scanning area S may be located at a front side of the signal terminal. The millimeter-wave transceiving antenna module 10 may move along a vertical direction to scan the predetermined scanning area S. This scheme can realize single-side vertical scanning, and can complete the 3D scanning of a human body by scanning twice when a man stands in the predetermined scanning area S. The front and rear sides of the human body may be respectively facing the millimeter-wave transceiving antenna module 10.

It can be understood that the millimeter-wave transceiving antenna module 10 may also adopt other arrangement manners to scan the predetermined scanning area S.

Furthermore, in one embodiment, the dustproof film 20 may be a polytetrafluoroethylene film, a polystyrene film, a polyvinyl acetate film, a polyimide film, a polyethylene film, or other dustproof film. The above-mentioned dustproof films 20 can seal the transmission antenna(s) 111 and the reception antenna(s) 112 to proof dust, and the dielectric constant of the dustproof film 20 may be lower than that of an organic glass, which may have a higher transmittance and a lower attenuation for millimeter waves. The thickness of the dustproof film 20 may be in a range of 0.01 to 1 mm, and the dustproof film 20 in the range may have a small attenuation to millimeter waves. In one embodiment, the thickness of the dustproof film 20 may be 0.05 mm, and the dustproof film 20 may be frugal in materials and stable in assembly. Since the thickness of the dustproof film 20 may be only 1/60 of the thickness of the organic glass (3 mm), which may reduce the attenuation of the dustproof film 20 to millimeter-wave transceiving antenna signals, thereby improving the 3D imaging effect of a security-inspection device. The dustproof film 20 may be easy to purchase, and the cost may be much lower than that of the existing sealing structure using organic glass and other mechanical structures.

Referring to FIG. 2 to FIG. 5, a security-inspection device provided in this embodiment of the present disclosure may include the above-mentioned scanning apparatus 100 and an image processing device (no shown), which may be electrically connected with the scanning apparatus 100 and configured to form a 3D image of a to-be-imaged object according to detection signals of the millimeter-wave transceiving antenna module 10. In this embodiment, when the security-inspection device is in operation, the rotation driving member 30 may drive the connector 31 and drive the two millimeter-wave transceiving antenna modules 10 to perform a cylindrical rotation scan of 120°. The millimeter wave signals sequentially emitted by a plurality of transmission antenna(s) 111 may irradiate to a human body through the dustproof film 20, and the millimeter wave signals reflected by the human body may be sequentially received by the plurality of reception antenna(s) 112 through the dustproof film 20, which may perform a 3D imaging detection by the image processing device. The selection of the driving member 30, the amount and moving range of the millimeter-wave transceiving antenna modules 10, and the amount of the millimeter-wave transceiving antenna units 11 may be configured as needed.

In one embodiment, the main body 200 may have an entrance 201 and an exit 202 both communicating with the inner cavity respectively. The predetermined scanning area S may be formed in the main body 200, and the scanning apparatus 100 may be mounted on the main body 200. The main body 200 may serve as a carrier for mounting various components such as the scanning apparatus 100 and the driving member 30. The entrance 201 and the exit 202 may be disposed oppositely. The human may enter the predetermined scanning area S through the entrance 201, and exit the predetermined scanning area S through the exit 202.

Figure 6:
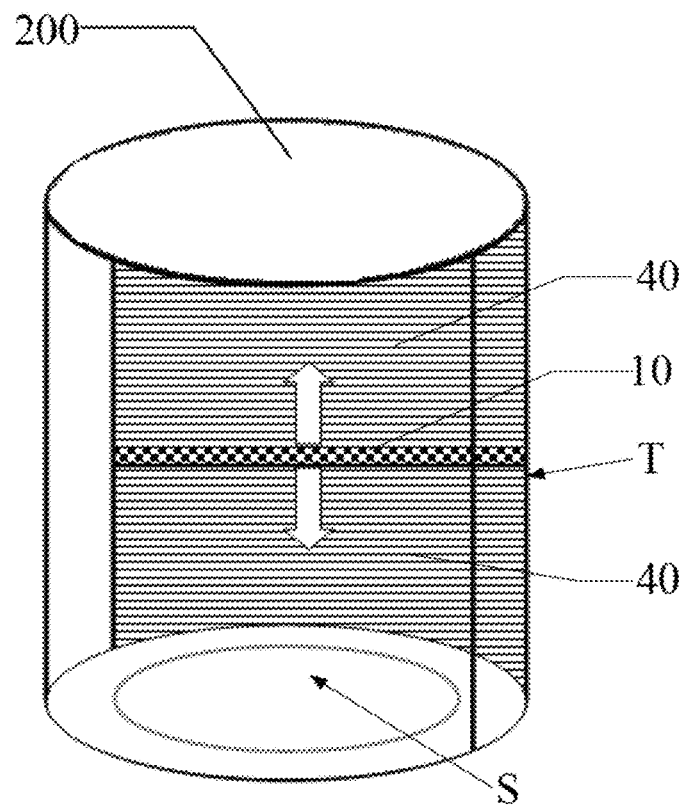
FIG. 6 is a schematic diagram of the structure of a security-inspection device according to a second embodiment of the present disclosure.

Referring to FIG. 6, a schematic diagram of the structure of a security-inspection device according to another embodiment of the present disclosure is depicted. The security-inspection device provided by this embodiment of the present disclosure may be substantially the same as that provided by the above-mentioned embodiment. The difference from the above-mentioned and this embodiment may be that the amount of millimeter-wave transceiving antenna modules 10 may be two. The two millimeter-wave transceiving antenna modules 10 may be distributed oppositely. The predetermined scanning area S may be located between the two millimeter-wave transceiving antenna modules 10, and the two millimeter-wave transceiving antenna modules 10 may move in a vertical direction to scan the predetermined scanning area S. This scheme can realize the bilateral vertical scanning, and can complete the 3D scanning of a human body by scanning once when a man stands in the predetermined scanning area S.

In one embodiment, two protection devices 40 may be disposed on two side portions of the bar-shaped millimeter wave transceiver antenna module 10. One side of the protection device 40 may be fixed to one end of the predetermined track T. and the other side of the protection device 40 may be fixed to one of the side portions of the millimeter wave transceiver antenna module 10. When the millimeter wave transceiver antenna module 10 moves on the predetermined trajectory T, the two protection devices 40 may be stretched out and drawn back with the millimeter wave transceiver antenna module 10. The protection devices 40 may function as barriers to prevent foreign object from falling into or prevent human body from entering the movement trajectory of the millimeter-wave transceiving antenna module 10.

It can be understood that the millimeter-wave transceiving antenna module 10 can also scan the predetermined scanning area S by using full-surface scanning, bilateral horizontal scanning, partial rotation scanning, single-side horizontal scanning, single-side vertical scanning, or other arrangements.

The above-mentioned embodiments merely represent several examples of the present disclosure, and the description thereof is more specific and detailed, but it should not be considered as limitations to the scope of the present disclosure. It should be noted that, for those skilled in the art, various variations and improvements may be made without departing from the concept of the present disclosure and are all within the protection scope of the present disclosure. Therefore, the protection scope of the present disclosure shall be subject to the appended claims.

What is claimed is:

1. A scanning apparatus, comprising:
at least one millimeter-wave transceiving antenna module configured to scan a to-be-imaged object in a predetermined scanning area, wherein the millimeter-wave transceiving antenna module comprises a plurality of millimeter-wave transceiving antenna units each having a signal terminal facing the predetermined scanning area;
a dustproof film covering the signal terminal of each of the millimeter-wave transceiving antenna units; and
a main body that comprises the millimetre-wave transceiving antenna module and a predetermined trajectory for the millimetre-wave transceiving antenna to travel;
the predetermined trajectory having two ends;
the millimetre-wave transceiving antenna module is configured to move along the predetermined trajectory between the two ends;
a first protection device connected to a first side of the millimetre-wave transceiving antenna module and connected to a first end of the predetermined trajectory of the main body;

the first protection device configured to be stretched out and drawn back along the predetermined trajectory as the millimetre-wave transceiving antenna module moves from the first end of the predetermined trajectory to a second end of the predetermined trajectory.

2. The scanning apparatus of claim 1, further comprising a driving member configured for driving the millimeter-wave transceiving antenna module to move along the predetermined trajectory so as to scan the predetermined scanning area.

3. The scanning apparatus of claim 2, wherein the scanning apparatus comprises two millimeter-wave transceiving antenna modules; the two millimeter-wave transceiving antenna modules are opposite to each other; the predetermined scanning area is located between the two millimeter-wave transceiving antenna modules; the two millimeter-wave transceiving antenna modules are connected via a connecting member, and the connecting member is driven to move by the driving member.

4. The scanning apparatus of claim 1, wherein each millimeter-wave transceiving antenna module comprises at least two millimeter-wave transceiving antenna units; millimeter waves transmitted from the millimeter-wave transceiving antenna units in sequence pass through the dustproof film and irradiate to the to-be-imaged object, and the millimeter waves are reflected by the to-be-imaged object to pass through the dustproof film and be sequentially received by the millimeter-wave transceiving antenna units.

5. The scanning apparatus of claim 4, wherein the millimeter-wave transceiving antenna units in each millimeter-wave transceiving antenna modules are arranged in at least one column.

6. The scanning apparatus of claim 1, wherein each of the millimeter-wave transceiving antenna units comprises a transmission antenna and a reception antenna disposed adjacent to the transmission antenna; or each of the millimeter-wave transceiving antenna units is an integrated transceiver antenna.

7. The scanning apparatus of claim 1, wherein in a direction of the predetermined trajectory, the millimeter-wave transceiving antenna module has a first side portion and a second side portion distributed back-to-back, the two ends of the predetermined trajectory are a first end near to the first side portion and a second end near to the second side portion.

8. The apparatus of claim 7, wherein the amount of the predetermined trajectory is at least one, two protection devices are arranged on each predetermined trajectory, a side of one of the two protection devices is fixed to the first end of each predetermined trajectory, the other side of one of the two protection devices is fixed to the corresponding first side portion, and a side of the other of the two protection devices is fixed to the second end of each predetermined trajectory, the other side of the other of the two protection devices is fixed to the second side portion.

9. The scanning apparatus of claim 1, wherein the scanning apparatus comprises two millimeter-wave transceiving antenna modules distributed oppositely, the predetermined scanning area is located between the two millimeter-wave transceiving antenna modules, and the two millimeter-wave transceiving antenna modules rotate around a same plumb line to scan the predetermined scanning area.

10. The scanning apparatus of claim 1, wherein the scanning apparatus comprises two millimeter-wave transceiving antenna modules distributed oppositely, the predetermined scanning area is located between the two millimeter-wave transceiving antenna modules, and the two millimeter-wave transceiving antenna modules move along a same horizontal direction to scan the predetermined scanning area.

11. The scanning apparatus of claim 1, wherein the scanning apparatus comprises two millimeter-wave transceiving antenna modules distributed oppositely, the predetermined scanning area is located between the two millimeter-wave transceiving antenna modules, and the two millimeter-wave transceiving antenna modules move along a vertical direction to scan the predetermined scanning area.

12. The scanning apparatus of claim 1, wherein the scanning apparatus comprises a millimeter-wave transceiving antenna module, the predetermined scanning area is located at a front side of the signal terminal, and the millimeter-wave transceiving antenna module rotates around a plumb line to scan the predetermined scanning area.

13. The scanning apparatus of claim 1, wherein the scanning apparatus comprises a millimeter-wave transceiving antenna module, the predetermined scanning area is located at a front side of the signal terminal, and the millimeter-wave transceiving antenna module moves along a horizontal direction to scan the predetermined scanning area.

14. The scanning apparatus of claim 1, wherein the scanning apparatus comprises a millimeter-wave transceiving antenna module, the predetermined scanning area is located at a front side of the signal terminal, and the millimeter-wave transceiving antenna module moves along a vertical direction to scan the predetermined scanning area.

15. The scanning apparatus of claim 1, wherein the dustproof film is a polytetrafluoroethylene film, a polystyrene film, a polyvinyl acetate film, a polyimide film, or a polyethylene film.

16. A security-inspection device, comprising a scanning apparatus and an image processing device electrically connected with the scanning apparatus configured to form a 3D image of a to-be-imaged object according to a detection signal of the millimeter-wave transceiving antenna module, wherein the scanning apparatus comprises:
at least one millimeter-wave transceiving antenna module configured to scan the to-be-imaged object in a predetermined scanning area and move along a predetermined trajectory; and
a main body that comprises the millimetre-wave transceiving antenna module and a predetermined trajectory for the millimetre-wave transceiving antenna module to travel;
the predetermined trajectory having two ends; the millimetre-wave transceiving antenna module is configured to move along the predetermined trajectory between the two ends;
a first protection device connected to a first side of the millimetre-wave transceiving antenna module and connected to a first end of the predetermined trajectory of the main body;
the first protection device configured to be stretched out and drawn back along the predetermined trajectory as the millimetre-wave transceiving antenna module moves from the first end of the predetermined trajectory to the second end of the predetermined trajectory.

17. The security-inspection device of claim 16, wherein the millimeter-wave transceiving antenna module comprises a plurality of millimeter-wave transceiving antenna units each having a signal terminal facing the predetermined scanning area.

18. The security-inspection device of claim 17, wherein the scanning apparatus further comprises a dustproof film covering the signal terminal of each of the millimeter-wave transceiving antenna units.

19. The security-inspection device of claim 17, further comprising a main body having an inner cavity, wherein the main body has an entrance and an exit both communicating with the inner cavity respectively, the predetermined scanning area is formed in the main body, and the scanning apparatus is mounted on the main body.

* * * * *